US010681127B2

(12) United States Patent
Liu

(10) Patent No.: US 10,681,127 B2
(45) Date of Patent: Jun. 9, 2020

(54) FILE UPLOAD METHOD AND SYSTEM

(71) Applicant: TENCENT TECHNOLOGY (SHENZHEN) COMPANY LIMITED, Shenzhen (CN)

(72) Inventor: Gang Liu, Shenzhen (CN)

(73) Assignee: Tencent Technology (Shenzhen) Company Limited, Shenzhen, Guangdong Province (CN)

(*) Notice: Subject to any disclaimer, the term of this patent is extended or adjusted under 35 U.S.C. 154(b) by 353 days.

(21) Appl. No.: 14/684,149

(22) Filed: Apr. 10, 2015

(65) Prior Publication Data
US 2015/0215400 A1 Jul. 30, 2015

Related U.S. Application Data

(63) Continuation of application No. PCT/CN2013/084894, filed on Oct. 9, 2013.

(30) Foreign Application Priority Data

Oct. 12, 2012 (CN) .......................... 2012 1 0387535

(51) Int. Cl.
*H04L 29/08* (2006.01)
*H04L 12/26* (2006.01)
*H04L 29/06* (2006.01)

(52) U.S. Cl.
CPC .......... *H04L 67/1095* (2013.01); *H04L 43/10* (2013.01); *H04L 67/06* (2013.01); *H04L 67/42* (2013.01)

(58) Field of Classification Search
CPC ..... H04L 67/1095; H04L 67/42; H04L 67/06; H04L 43/10
See application file for complete search history.

(56) References Cited

U.S. PATENT DOCUMENTS

| 7,570,600 | B1* | 8/2009 | Slaughter | H04L 12/282 370/217 |
| 7,574,488 | B2* | 8/2009 | Matsubara | H04L 63/101 709/219 |

(Continued)

FOREIGN PATENT DOCUMENTS

| CN | 1996843 A | 7/2007 |
| CN | 101079709 A | 11/2007 |

(Continued)

OTHER PUBLICATIONS

International Search Report for Application No. PCT/CN2013/084894 dated Jan. 23, 2014, and its English translation thereof.

(Continued)

*Primary Examiner* — Nam T Tran
*Assistant Examiner* — Angela M Widhalm De Rodrig
(74) *Attorney, Agent, or Firm* — Morgan, Lewis & Bockius LLP

(57) ABSTRACT

A first client performs fragmentation on a to-be-uploaded file, to obtain multiple file fragments, and calculates check information of the file fragments. The first client uploads a file fragment to a second server according to an address of the second server obtained from a first server. When the first client uploads the file fragment, the first server sends a file identifier of the file to a third server; the third server determines, according to the file identifier of the file, a second client that saves at least one file fragment. According to file upload information separately sent by the third server to the first client and the second client, the first client and the second client separately upload a corresponding file fragment.

7 Claims, 6 Drawing Sheets

(56) References Cited

U.S. PATENT DOCUMENTS

| | | | | |
|---|---|---|---|---|
| 7,627,328 | B2* | 12/2009 | Fuller, Jr. | H04L 67/04 455/422.1 |
| 7,818,407 | B2* | 10/2010 | O'Neal | H04L 12/1854 709/221 |
| 7,822,856 | B2* | 10/2010 | Zuckerman | H04L 67/1008 709/217 |
| 7,852,767 | B2* | 12/2010 | Twiss | H04L 45/04 370/235 |
| 7,903,652 | B2* | 3/2011 | Huang | H04L 65/4076 370/390 |
| 8,041,803 | B2* | 10/2011 | Yu | G06Q 30/06 709/224 |
| 8,077,602 | B2* | 12/2011 | Arimilli | G06F 15/17 370/217 |
| 8,204,791 | B2* | 6/2012 | Chavez | G06Q 30/0283 705/1.1 |
| 8,473,585 | B1* | 6/2013 | Smith | H04L 67/1097 709/218 |
| 8,606,886 | B2* | 12/2013 | Kerr | G06F 9/4856 709/220 |
| 9,122,698 | B2* | 9/2015 | Lacapra | H04L 67/104 |
| 9,154,552 | B2* | 10/2015 | Hickmott | H04L 67/104 |
| 9,350,802 | B2* | 5/2016 | Maltbie | H04L 67/06 |
| 10,289,688 | B2* | 5/2019 | Resch | H04L 63/06 |
| 2003/0014477 | A1* | 1/2003 | Oppenheimer | H04L 12/1813 709/203 |
| 2003/0023505 | A1* | 1/2003 | Eglen | G06Q 10/00 705/26.41 |
| 2003/0154284 | A1* | 8/2003 | Bernardin | G06F 9/465 709/226 |
| 2004/0111390 | A1* | 6/2004 | Saito | G06F 11/1435 |
| 2005/0007964 | A1* | 1/2005 | Falco | H04L 29/06 370/256 |
| 2007/0288593 | A1 | 12/2007 | Wang | |
| 2008/0034394 | A1* | 2/2008 | Jacobs | H04N 7/17318 725/98 |
| 2008/0133538 | A1* | 6/2008 | Chavez | H04L 67/104 |
| 2008/0133698 | A1* | 6/2008 | Chavez | H04L 67/104 709/217 |
| 2008/0133767 | A1* | 6/2008 | Birrer | H04L 65/4076 709/231 |
| 2008/0222236 | A1* | 9/2008 | Nason | H04L 67/34 709/201 |
| 2008/0235746 | A1* | 9/2008 | Peters | H04N 7/17318 725/111 |
| 2009/0083132 | A1* | 3/2009 | Doganaksoy | G06F 21/10 705/7.29 |
| 2009/0119386 | A1* | 5/2009 | Busser | H04L 29/12028 709/218 |
| 2009/0199250 | A1* | 8/2009 | Assouline | H04N 7/173 725/96 |
| 2011/0176547 | A1* | 7/2011 | Lejeune | H04L 12/1877 370/390 |
| 2012/0233228 | A1* | 9/2012 | Barton | H04L 67/06 707/827 |
| 2013/0031211 | A1* | 1/2013 | Johnson | H04N 21/23103 709/218 |
| 2015/0006895 | A1* | 1/2015 | Irvine | G06F 21/6254 713/171 |
| 2015/0058420 | A1* | 2/2015 | Rouibia | H04L 67/1063 709/204 |
| 2019/0251061 | A1* | 8/2019 | Vas | G06F 16/13 |

FOREIGN PATENT DOCUMENTS

| | | |
|---|---|---|
| CN | 101141476 A | 3/2008 |
| CN | 101635737 A | 1/2010 |
| CN | 101674330 A | 3/2010 |
| CN | 101699822 A | 4/2010 |
| CN | 102420843 A | 4/2012 |
| EP | 0993163 A1 | 4/2000 |

OTHER PUBLICATIONS

Chinese Office Action for Application No. 201210387535X dated Jul. 4, 2014, and an English concise explanation of relevance thereof.

International Preliminary Report for Application No. PCT/CN2013/084894 dated Oct. 9, 2013.

* cited by examiner

FILE UPLOAD METHOD AND SYSTEM

CROSS-REFERENCE TO RELATED APPLICATIONS

This application is a continuation of International Application No. PCT/CN2013/084894 filed on Oct. 9, 2013. This application claims the benefit and priority of Chinese Application No. 201210387535.X filed Oct. 12, 2012. The entire disclosures of each of the above applications are incorporated herein by reference.

FIELD

The present disclosure relates to a file upload method and system.

BACKGROUND

This section provides background information related to the present disclosure which is not necessarily prior art.

When a local file needs to be uploaded to a cloud storage server, a peer to peer (P2P) technology may be used to increase a speed of uploading the file. A unique identifier HASH of a to-be-uploaded file of a user is associated with a network node that is currently performing P2P. In this way, other P2P nodes that are downloading or have downloaded the file may assist an original upload node in uploading corresponding file fragments according to the HASH of the to-be-uploaded file. When a download client exchanges a data fragment with a P2P network, under unified scheduling of a storage interface server, the download client may further copy the corresponding data fragment for upload, and in this way, a speed of uploading the file may be increased.

In the existing technology, when uploading a file to a cloud storage server, a private client and a server acquire an interface address of the to-be-uploaded file by using an upload logic server and then scan the file locally to perform fragmentation on the file and calculate check information of each fragment. In addition, the private client and the server upload each fragment to a storage interface server in a multi-threaded manner according to the interface address. The check information is used to check during download whether obtained data is correct.

Existing technology has at least the following challenges. When multiple clients upload the same file, data sharing during upload cannot be directly implemented. As a result, each client needs to transmit the file data separately, and upload bandwidth resources are wasted. In particular, when an asymmetric digital subscriber line (ADSL) is generally used to transmit data, the speed of uploading a file is reduced due to limited ADSL upload bandwidth resources.

SUMMARY

This section provides a general summary of the disclosure, and is not a comprehensive disclosure of its full scope or all of its features.

Various embodiments provide a file upload method and system, which can reduce occupation of network resources, implement data sharing, and increase the speed of uploading a file during file upload.

A file upload method is provided according to various embodiments, which includes:

performing, by a first client, fragmentation on a to-be-uploaded file, to obtain multiple file fragments;

uploading, by the first client, at least one of the file fragments to a second server according to an address of the second server obtained from a first server;

sending, by the first server, a file identifier of the file to a third server when the first client uploads the at least one of the file fragments;

determining, by the third server according to the file identifier of the file, a second client that saves at least one of the file fragments;

uploading, by the first client when receiving first file upload information sent by the third server, to the second server a first file fragment corresponding to a file fragment identifier carried in the first file upload information; and uploading, by the second client when receiving second file upload information sent by the third server, to the second server a second file fragment corresponding to a file fragment identifier carried in the second file upload information.

The method further includes:

sending, by the second client, query information to the third server; and forwarding, by the third server, the query information to a fourth server, wherein the query information comprises the file identifier;

querying, by the fourth server according to the query information, for a node that completes download of the file or is downloading the file;

sending, by the fourth server when the node is found, information of the node to the second client by using the third server; and downloading, by the second client, the file from the node.

In the method, determining a second client that saves the at least one of the file fragments includes:

receiving, by the third server, a file identifier being reported by means of heartbeat and being of a shareable file and determining, when the file identifier of the shareable file is the same as the file identifier of the file being uploaded, that a client that reports the file identifier of the shareable file is the second client; or determining, by the third server, when finding a client that completes download of the file or is downloading the file, that the found client is the second client.

The method further includes:

checking, by the second server, the first file fragment when the first file fragment is uploaded;

writing the first file fragment into a fifth server when the check for the first file fragment is successful; sending, by the second server to the first client and the second client, a message indicating that the first file fragment is uploaded; and writing the file identifier of the file, a size of the file, and a name of the file into a sixth server;

checking, by the second server, the second file fragment when the second file fragment is uploaded;

writing the second file fragment into the fifth server when the check for the second file fragment is successful; sending, by the second server to the first client and the second client, a message indicating that the second file fragment is uploaded; and writing the file identifier of the file, the size of the file, and the name of the file into the sixth server.

The method further includes:

sending, by the third server to the first client when the check for the first file fragment or the check for the second fragment is unsuccessful, the first file upload information that carries the file fragment identifier of the first file fragment when the check for the first file fragment is unsuccessful or carries the file fragment identifier of the second file fragment when the check for the second fragment is unsuccessful; or sending, by the third server to the second client when the check for the first file fragment or the check for the second fragment is unsuccessful, the second file upload information that carries the file fragment identifier of the first file fragment when the check for the first file fragment is unsuccessful or carries the file fragment identifier of the second file fragment when the check for the second fragment is unsuccessful. According to another aspect, another file upload method is provided according to an embodiment of the present invention, which includes:

performing, by a first client, fragmentation on a to-be-uploaded file, to obtain multiple file fragments, and calculating check information of the file fragments;

uploading, by the first client, at least one file fragment in the multiple file fragments to a second server according to an address of the second server found from a first server;

sending, by the first server, a file identifier of the file to a third server when the first client uploads the at least one file fragment; and uploading, by the second client when receiving file upload information sent by the third server, to the second server a file fragment corresponding to a file fragment identifier carried in the file upload information.

The method further includes:
reporting, by the second client to the third server by means of heartbeat, a file identifier of a shareable file.

The method further includes:
checking, by the second server, when a file fragment in the at least one file fragment is uploaded, the uploaded file fragment;

writing the uploaded file fragment into a fifth server when the check is successful;

sending, to the first client and the second client, a message indicating that the file fragment is uploaded; and writing the file identifier of the file, a size of the file, and a name of the file into a sixth server.

The method further includes:
sending, by the third server, the file upload information to the first client or the second client when the check is unsuccessful, so that the first client or the second client uploads the file fragment according to the file upload information.

In the method, the file upload information comprises a file fragment identifier of at least one file fragment that is in the multiple file fragments and needs to be uploaded by the first client or the second client.

A file upload system is provided according to various embodiments, which include:

a first client, configured to perform fragmentation on a to-be-uploaded file, to obtain multiple file fragments; upload at least one of the file fragments to a second server according to an address of the second server found from a first server; and upload, when receiving first file upload information sent by a third server, a first file fragment to the second server according to a file fragment identifier carried in the first file upload information;

a second client, configured to upload, when receiving second file upload information sent by the third server, a second file fragment to the second server according to a file fragment identifier carried in the second file upload information;

the first server, configured to send a file identifier of the file to the third server when the first client uploads the at least one of the file fragments;

the second server, configured to receive the first file fragment sent by the first client, and receive the second file fragment sent by the second client; and the third server, configured to receive the file identifier of the file sent by the first server, determine, according to the file identifier of the file, the second client that saves at least one of the multiple file fragments, send the first file upload information to the first client, and send the second file upload information to the second client.

In the system,
the second client is further configured to send query information to the third server, wherein the query information comprises the file identifier;

the third server is configured to send the query information to a fourth server;

the fourth server is configured to query, according to the query information, for a node that completes download of the file or is downloading the file, and send, when the node is found, information of the node to the second client by using the third server; and the second client is further configured to download the file from the node.

In the system,
the third server is configured to receive a file identifier being reported by means of heartbeat and being of a shareable file, and determine, when the file identifier of the shareable file is the same as file identifier of the file being uploaded, that a client that reports the file identifier of the shareable file is the second client; or the third server is configured to determine, when finding a client that completes download of the file or is downloading the file, that the found client is the second client.

In the system, the second server is further configured to:
check the first file fragment when the first file fragment is uploaded, write the first file fragment into a fifth server when the check for the first file fragment is successful, send, to the first client and the second client, a message indicating that the first file fragment is uploaded, and write the file identifier of the file, a size of the file, and a name of the file into a fifth server;

check the second file fragment when the second file fragment is uploaded, write the second file fragment into the fifth server when the check for the second file fragment is successful, send, to the first client and the second client, a message indicating that the second file fragment is uploaded, and write the file identifier of the file, the size of the file, and the name of the file into the fifth server.

In the system,
the third server is further configured to send, to the first client when the check for the first file fragment or the check for the second fragment is unsuccessful, the first file upload information that carries the file fragment identifier of the first file fragment when the check for the first file fragment is unsuccessful or carries the file fragment identifier of the second file fragment when the check for the second fragment is unsuccessful; or send, to the second client, the second file upload information that carries the file fragment identifier of the first file fragment when the check for the first file fragment is unsuccessful or carries the file fragment identifier of the second file fragment when the check for the second fragment is unsuccessful.

According to another aspect, another file upload system is provided according to various embodiments, which include:

a first client, configured to perform fragmentation on a to-be-uploaded file, to obtain multiple file fragments, and calculate check information of the file fragments; and upload at least one file fragment in the multiple file fragments to a second server according to an address of the second server found from a first server;

the first server, configured to send a file identifier of the file to a third server when the first client uploads the at least one file fragment;

the third server, configured to receive the file identifier of the file sent by the first server, and send, to a second client, file upload information for uploading the file;

the second client, configured to upload, to the second server according to the file upload information when receiving the file upload information sent by the third server, at least one file fragment that is in the multiple file fragments of the file and needs to be uploaded by the second client; and the second server, configured to receive at least one file fragment that is in the multiple file fragments and sent by the first client and/or the second client.

In the system, the third server is further configured to receive a file identifier of a shareable file, wherein the file identifier is reported by the second client by means of heartbeat.

In the system, the second server is further configured to:

check, when a file fragment in the at least one file fragment is uploaded, the uploaded file fragment;

write the uploaded file fragment into a fifth server when the check is successful; send, to the first client and the second client, a message indicating that the file fragment is uploaded; and write the file identifier of the file, a size of the file, and a name of the file into a sixth server.

In the system, the third server is further configured to send the file upload information to the first client or the second client when the check is unsuccessful, so that the first client or the second client re-uploads the file fragment according to the file upload information.

In the system, the file upload information comprises a file fragment identifier of at least one file fragment that is in the multiple file fragments and needs to be uploaded by the first client or the second client.

Various embodiments provide a file upload method and system, where a first client performs fragmentation on a to-be-uploaded file to obtain multiple file fragments and calculates check information of the file fragments; the first client uploads a file fragment to a second server according to an address of the second server obtained from a first server; the first server sends a file identifier of the file to a third server when the first client uploads the file fragment; the third server determines, according to the file identifier of the file, a second client that saves all or some of the multiple file fragments; the first client uploads, when receiving first file upload information sent by the third server, a first file fragment to the second server according to an identifier, which is carried in the first file upload information, of the first file fragment that is in the multiple file fragments and needs to be uploaded by the first client; and the second client uploads, when receiving second file upload information sent by the third server, a second file fragment to the second server according to an identifier, which is carried in the second file upload information, of the second file fragment that is in the multiple file fragments and needs to be uploaded by the second client.

Solutions provided by various embodiments can associate a file uploaded by a user with a P2P download technology. When the user uploads the file, a terminal is enabled to upload a file locally saved by the terminal, thereby reducing occupation of network resources, implementing data sharing, and increasing a speed of uploading a file.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

To describe the technical solutions in the embodiments of the present invention or in the existing technology more clearly, the following briefly introduces the accompanying drawings required for describing the embodiments or the existing technology. The accompanying drawings in the following description show merely some embodiments of the present disclosure, and one with ordinary skill in the art may still derive other drawings from these accompanying drawings without creative efforts.

Corresponding reference numerals indicate corresponding parts throughout the several views of the drawings.

DETAILED DESCRIPTION

Various embodiments will now be described more fully with reference to the accompanying drawings.

The following clearly and completely describes the technical solutions in the various embodiments with reference to the accompanying drawings in the various embodiments. The described embodiments are some, rather than all, of the embodiments of the present disclosure. All other embodiments obtained by a person with ordinary skill in the art based on the various embodiments without creative efforts shall fall within the protection scope of the present disclosure.

Figure 1:
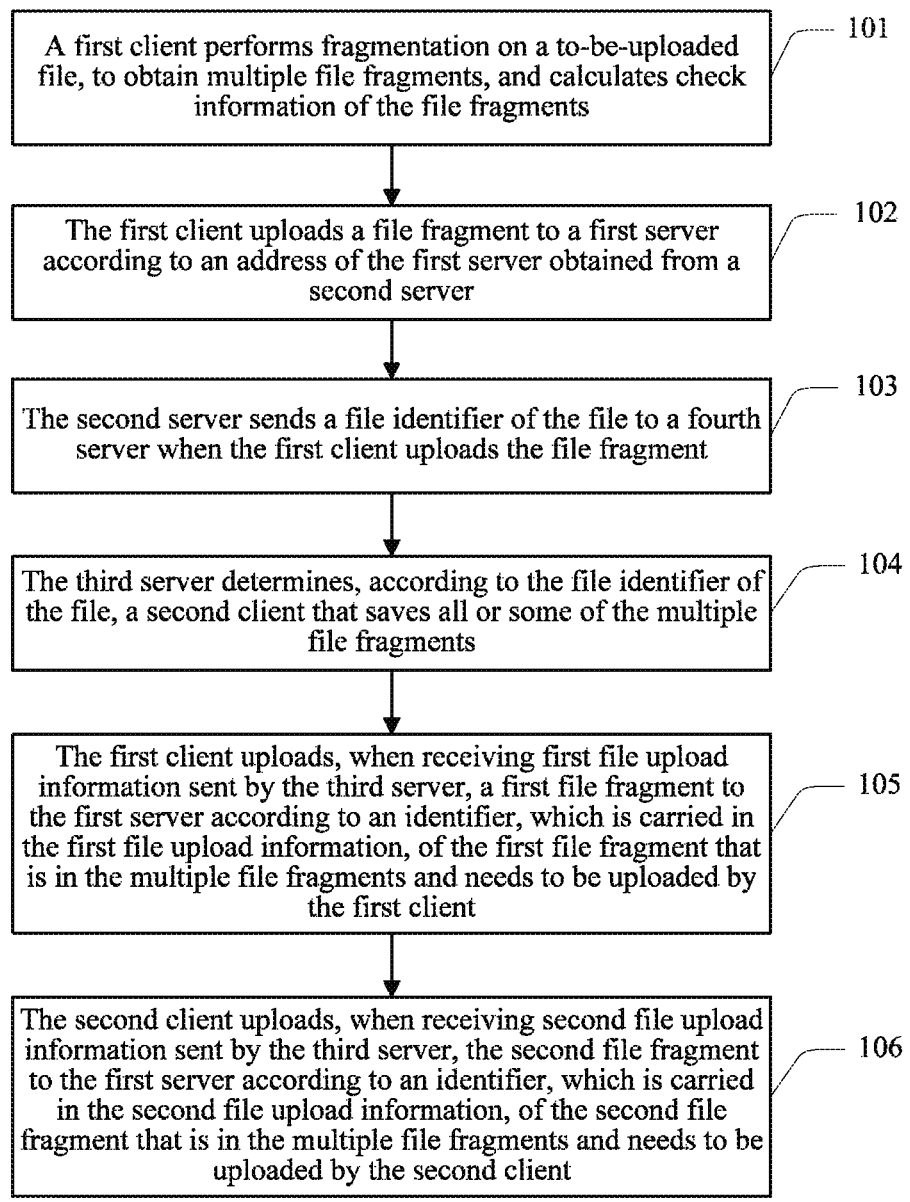
FIG. 1 is a flowchart of a file upload method according to various embodiments.

Various embodiments provide a file upload method. As shown in FIG. 1, the method includes:

Block 101: A first client performs fragmentation on a to-be-uploaded file to obtain multiple file fragments and calculates check information of the file fragments. The first client may perform fragmentation on the to-be-uploaded file by using an upload component, where the upload component may be implemented by using an Axtive control, which is a plug-in or an extension installed in a browser, uploads a file fragment locally, and supports resumable file transmission. The file fragment is uploaded to a first server. Resumable transmission is to interrupt upload during file upload. At this time, only a part of the file has been uploaded, and afterwards, when the file is uploaded again, the other parts of the file may be uploaded in a resumption manner.

In various embodiments, the upload component of the first client performs fragmentation on the to-be-uploaded file and calculates check information of the file fragment, specifically including performing fragmentation on the file according to a size of the to-be-uploaded file. For example, if a size of a file is T, the file is divided into N pieces according to a fragment size P(T), where N=(T+P(T)−1)/P(T). Generally, the fragment size is related to the size of the file. For example, a file after fragmentation may be 2M, 1M, or 512 KB, and a minimum size is generally 32 KB. If a to-be-uploaded file is quite large, for example, greater than 10 G, in order to avoid a large number of fragments, generally the total number of fragments is fixed, and the fragment size is not fixed, that is, fragmentation is performed on the to-be-uploaded file according to the number of fragments.

Each independent fragment is used as a small file to calculate a HASH value of file content as a unique identifier, and in this way, each fragment corresponds to a group of HASH values, and the group of HASH values is referred to as file check information. During downloading, each time when data of a complete fragment is obtained, it may be determined, by comparing the HASH value obtained through calculation with a check HASH value, whether the downloaded data is correct.

Block 102: The first client uploads the file fragment to a first server according to an address of the first server obtained from a second server. The second server is configured to communicate with the upload component of the first client, and determine whether a HASH of the file uploaded by the upload component of the first client exists in a third server. When the HASH of the file uploaded by the upload component of the first client does not exist in the third server, return to the upload component of the first client, an address of the first server to which the file needs to be uploaded. When the HASH of the file uploaded by the upload component of the first client exists in the third server, the second server sends to the upload component of the first client a message indicating that the to-be-uploaded file has been uploaded and does not need to be re-uploaded.

Block 103: The second server sends a file identifier of the file to a fourth server when the first client uploads the file fragment. When the upload component of the first client uploads the file fragment, the second server sends the file identifier of the to-be-uploaded file to the fourth server and the fourth server obtains the file identifier of the to-be-uploaded file by calculating check information of all file fragments of the file. In this block, when the upload component of the first client uploads the file fragment, the second server sends the file identifier of the to-be-uploaded file to the fourth server, so as to establish synchronization of a HASH value of the to-be-uploaded file between the second server and the fourth server, so that the second client can learn the HASH value of the currently to-be-uploaded file by using the fourth server, and the second client can upload, under the scheduling of the first server, some file fragments locally saved by the second client, thereby increasing the speed of uploading the file.

Block 104: The third server determines, according to the file identifier of the file, a third client that saves all or some of the multiple file fragments.

Block 105: The first client uploads, when receiving first file upload information sent by the third server, a first file fragment to the first server according to an identifier, which is carried in the first file upload information, of the first file fragment that is in the multiple file fragments and needs to be uploaded by the first client.

Block 106: The second client uploads, when receiving second file upload information sent by the third server, a second file fragment to the first server according to an identifier, which is carried in the second file upload information, of the second file fragment that is in the multiple file fragments and needs to be uploaded by the second client. Further, when receiving the first file fragment sent by the upload component of the first client and/or a second file fragment sent by at least one second client, the first server writes the first file fragment and/or the second file fragment into a fifth server.

It should be noted that generally, due to a limited bandwidth of an upload channel, there is more than one piece of software that is on a machine and needs to be accessed over a network connection. If a piece of software occupies excessive bandwidths of the upload channel, upload of other software may be affected. By pursuing the present disclosure, some work of uploading a file may be completed with the assistance of other second clients, which is equivalent to reducing occupation of network resources by an upload component of a client.

In various embodiments, the first server through the fifth server may be located in the same server, or may be located in different servers, which is not limited in the present disclosure. When the first server through the fifth server are located in different servers, the first server may be a storage interface server, the second server may be an upload logic server, the third server may be a storage index server, the fourth server may be an index access server, the fifth server may be a cloud storage server, and the sixth server may be an tracker application (TrackerApp) server. The first server through the fifth server may also be other servers, which is not limited in the present disclosure.

Various embodiments provide a file upload method, in which a file to be uploaded by a user is associated with a P2P download technology and a second client uploads, when a first client uploads a file, and according to file upload information sent on a network side, the file is locally saved by the second client, thereby reducing occupation of network resources, implementing data sharing, and increasing the speed of uploading a file.

Figure 2A:
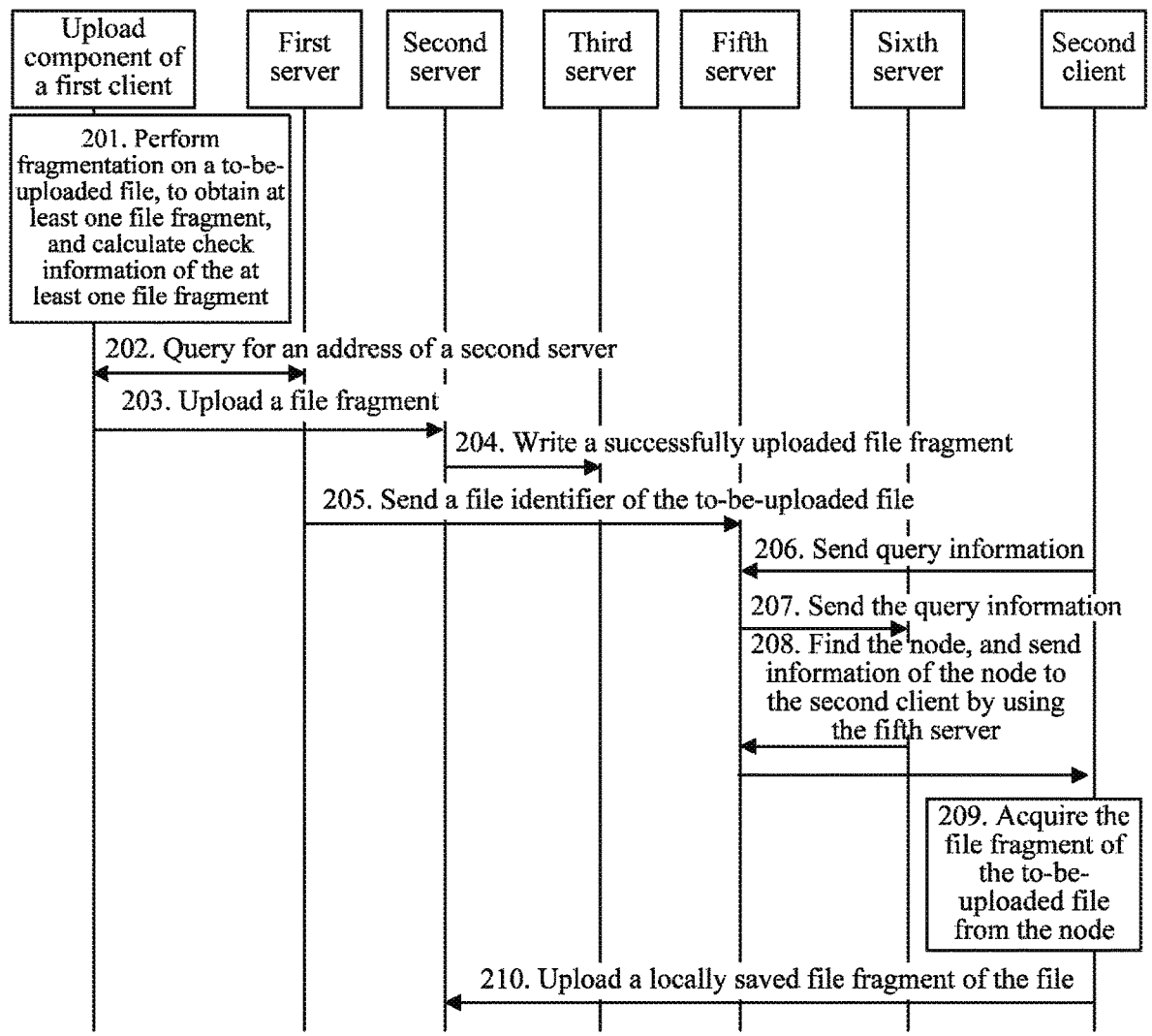
FIG. 2A is a flowchart of a file upload method according to various embodiments.

Various embodiments provide another file upload method. As shown in FIG. 2A, the method includes:

Block 201: An upload component of a first client performs fragmentation on a to-be-uploaded file to obtain at least one file fragment and calculates check information of the at least one file fragment. In various embodiments, the upload component of the first client may be implemented by using an Axtive control, which may be a plug-in or an extension installed in a browser.

In various embodiments, the upload component of the first client performs fragmentation on the to-be-uploaded file and calculates check information of the at least one file fragment, specifically including performing fragmentation on the file according to a size of the to-be-uploaded file. For example, if a size of a file is T, the file is divided into N pieces according to a fragment size P(T), where N=(T+P(T)−1)/P(T). Generally, the fragment size is related to the size of the file, for example, a file after fragmentation may be 2M, 1M, or 512 KB, and a minimum size is generally 32 KB. If a to-be-uploaded file is quite large, for example, greater than 10 G, in order to avoid a large number of fragments, generally the number of fragments is fixed, and the fragment size is not fixed, that is, fragmentation is performed on the to-be-uploaded file according to the number of fragments.

Each independent file fragment is used as a small file to calculate a group of HASH values of file content of the file fragment, and the group of HASH values is used as a unique identifier of the file fragment. In this way, each fragment corresponds to a group of HASH values. Such a group of HASH values is referred to as check information of the file fragment. During downloading, each time data of a complete fragment is obtained, a HASH value of the fragment may be calculated, and the HASH value obtained through calculation is compared with a check HASH value, to determine whether the downloaded data is correct.

Block 202: The upload component of the first client queries, from a first server, for an address of a second server. The upload component of the first client supports resumable file transmission. Resumable transmission is to interrupt upload during file upload. At this time, only a part of the file has been uploaded and, after a period of time after the interruption of file transmission, the other parts of the file may be uploaded in a resumption manner.

Figure 3:
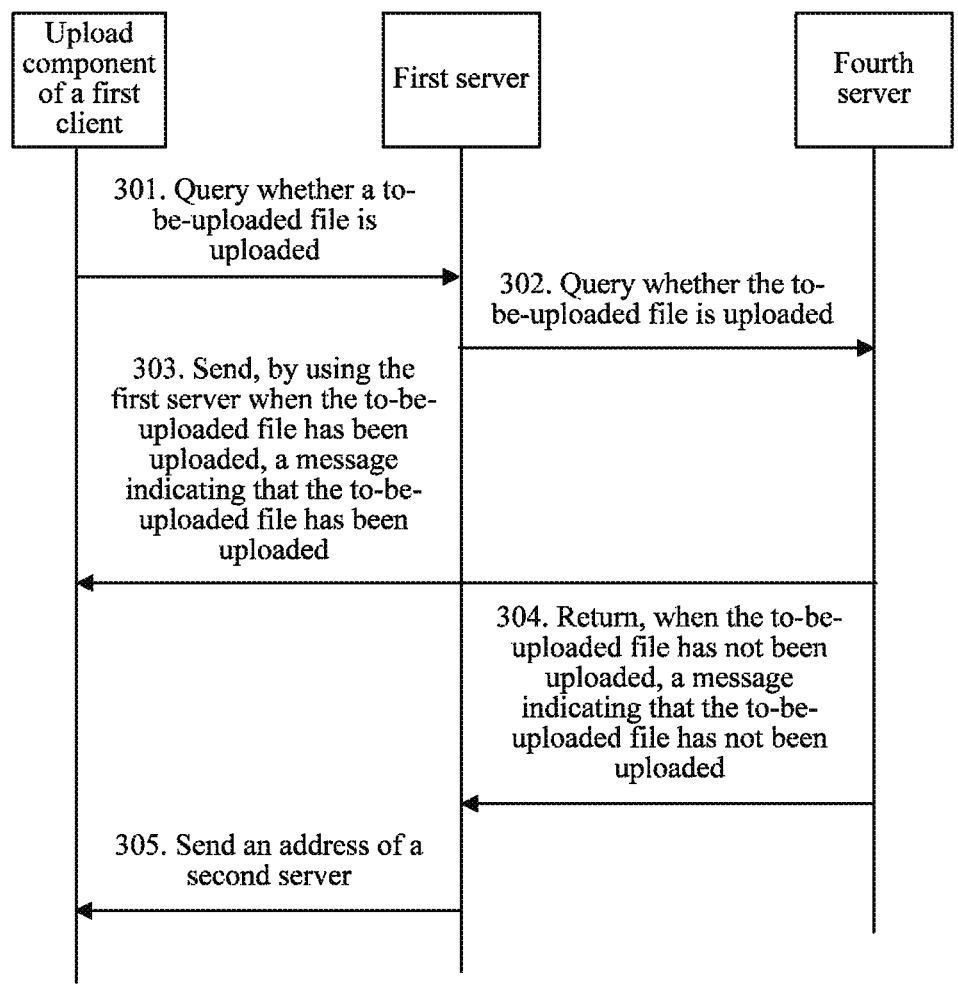
FIG. 3 is a flowchart showing that an upload component of a client queries for an address of a second server from a first server according to various embodiments.

As shown in FIG. 3, in this block, the upload component of the first client queries, from the first server, for the address of the second server which includes the following blocks:

Block 301: The upload component of the first client queries, from the first server, whether the to-be-uploaded file has been uploaded, that is, whether the file is stored in the third server.

Block 302: The first server queries, by using a fourth server, whether the to-be-uploaded file has been uploaded. In this block, the fourth server is configured to receive a query message sent by the first server, where the query message is used to query whether the to-be-uploaded file has been uploaded, the query message includes the file identifier of the to-be-uploaded file, and the file identifier of the to-be-uploaded file is obtained by calculating the check information of the file fragment. The fourth server saves file information such as HASH values of all files stored in the third server, the size of each file, upload duration of each file, and file names. After writing the uploaded file into the third server, the second server sends file information of the file to the fourth server for saving.

Block 303: The fourth server sends, to the upload component of the first client by using the first server when the file has been uploaded, a message indicating that the file has been uploaded. The first server compares a HASH value of the to-be-uploaded file with a HASH value of each file saved in the first server. When a HASH value of one file in HASH values of all files saved in the first server is the same as a HASH value of the to-be-uploaded file, it indicates that the to-be-uploaded file has been uploaded before, and at this time, instantaneous transmission is directly performed. That is, the first server sends, to the upload component of the first client, a message indicating that the to-be-uploaded file has been uploaded.

Block 304: The fourth server returns, to the first server when the to-be-uploaded file has not been uploaded, a message indicating that the to-be-uploaded file has not been uploaded. The first server compares the HASH value of the to-be-uploaded file with the HASH value of each file saved in the first server. When a HASH value of any file in the HASH values of all files saved in the first server is different from the HASH value of the to-be-uploaded file, it indicates that the to-be-uploaded file has not been uploaded.

Block 305: The first server sends an address of the second server to the upload component of the first client when receiving the message indicating that the to-be-uploaded file has not been uploaded. At this time, the first server sends the address of the second server to the upload component of the first client, so that the upload component of the first client uploads a file fragment of the to-be-uploaded file according to the address of the second server. It should be noted that when a part of the to-be-uploaded file has been uploaded, the first server receives, according to recorded information about resumed transmission of the to-be-uploaded file that has not been uploaded, a file fragment, uploaded by the first client in a resumption manner, of the to-be-uploaded file.

The upload component of the first client may support resumable file transmission. That is, if uploading is interrupted after a part of file data of the to-be-uploaded file has been uploaded, before restarting uploading, the upload component of the first client queries, from the first server, how much content has been uploaded. That is, queries information about resumed transmission of the to-be-uploaded file, and the first server may record the information about resumed transmission of the to-be-uploaded file that has not been uploaded. Then, the upload component of the first client uploads the file fragment of the to-be-uploaded file in a resumption manner according to the information about resumed transmission.

So far, the upload component of the first client finds the address of the second server from the first server, and subsequent blocks are further performed.

Block 203: The upload component of the first client uploads the file fragment to the second server according to the address of the second server found from the first server.

Block 204: The second server receives the file fragment uploaded by the upload component of the first client, and writes a successfully uploaded file fragment into a third server. Each time the second server receives a complete file fragment, the second server may calculate check information of the file fragment and check whether the uploaded file fragment is correct. When the uploaded file fragment is correct, the second server writes the file fragment into the third server and sends, to the upload component of the first client and the second client, a message indicating that the file fragment has been uploaded. Further, the second server writes a file identifier of the to-be-uploaded file, a size of the to-be-uploaded file, and a name of the to-be-uploaded file into a storage index server, for query by the upload logic server. When the check is unsuccessful, the upload component of the first client or the second client re-uploads, according to the file identifier of the to-be-uploaded file, an incorrectly uploaded file fragment in the to-be-uploaded file. The file fragment may be checked by using the existing technology, and various embodiments do not limit a manner of checking a file fragment.

It should be noted that generally, due to a limited bandwidth of an upload channel, there is more than one piece of software that is on a machine and needs to be accessed over a network connection. If a piece of software occupies excessive bandwidths of the upload channel, upload of other software may be affected. By pursuing the present disclosure, some work of uploading a file may be completed with the assistance of other second clients, which is equivalent to reducing occupation of network resources by an upload component of a client.

Block 205: The first server sends a file identifier of the file being uploaded to a fifth server when the upload component of the first client uploads the file fragment. In this block, the file identifier of the file being uploaded is obtained by calculating check information of all file fragments of the file being uploaded. When the upload component of the first client uploads the file fragment, the first server sends the file identifier of the file being uploaded to the fifth server, so as to establish synchronization of a HASH value of the file being uploaded between the first server and the fifth server, so that the second client can learn the HASH value of the file currently being uploaded by using the fifth server and the second client can upload, under the scheduling of the fifth server, some file fragments locally saved by the second client, thereby increasing a speed of uploading the file.

Block 206: The second client sends query information to the fifth server, where the query information is to query for any PEER (node) that has downloaded or is downloading a file fragment of the file being uploaded. The query information includes the file identifier of the file being uploaded. The second client may query, from a multi-source index server, for a resource and file check information that are intended to be downloaded, that is, the second client queries for a multi-source uniform/universal resource locator (URL) set, and then downloads a file fragment from the found URL set. It should be noted that the file fragment herein is a file fragment of a file intended to be downloaded by a user of the second client. The file fragment may also be a file fragment of a file to be uploaded by the upload component of the first client.

After receiving download query information sent by the second client, the multi-source index server queries, from a multi-source index database, whether a resource intended to be downloaded by the second client exists.

The multi-source index server is configured to receive a URL or a HASH value of a URL that is sent by the second client, and use the URL or the HASH value as an index entrance to query for the HASH value of the file fragment or a unique identifier of a file set in which the file is located, receive a URL or a HASH value of a URL that is sent by the second client, and use the URL or the HASH value as an index entrance to query for a downloaded multi-URL resource set, and is further configured to provide check information of a file fragment or centralized file check information of a file set for the second client to check validity of downloaded data. The multi-source index database saves the check information of the file fragment and may provide a multi-resource query service for the multi-source index server. The multi-source index database is further used to save, to the URL set, a HASH 1 and a HASH 2 that correspond to the URL, that is, the URL is a character string. The URL may be used as an input, to calculate a HASH 1, that is, a corresponding HASH 1 is obtained by using a URL; the latter HASH 2 is a HASH 2 of file content, and the HASH 1 and the HASH 2 may be in a one-to-one correspondence. Conversely, a HASH 2 of a piece of file content may have different link URLs, which is a one-to-many correspondence, and therefore, is referred to as a set from the HASH 2 to the URL.

In this block, the second client queries, from the fifth server, whether a PEER exists, where the PEER is a client that has downloaded or is downloading, with the second client, the same file. The second client and the PEER are in a P2P relationship. The fifth server is configured to maintain communication of node report, heartbeat, adding or deleting a file with the second client. Heartbeat refers to periodical communication between the second client and the fifth server. In such a manner, it is ensured that a node is online and, if an index access server does not receive within a period of time a heartbeat message sent by the second client, it is deemed that the second client is offline.

Block 207: The fifth server sends the query information to a sixth server. It should be noted that the sixth server is further configured to receive node information for registration sent by the fifth server and a PEER information list that can maintain a file on line.

Block 208: The sixth server finds the PEER according to the query information and sends the PEER to the second client by using the fifth server. The sixth server receives a query message sent by the fifth server, implements a specific PEER selection algorithm and policy according to the query message, and provides a PEER query service for the fifth server.

Block 209: The second client acquires the file fragment of the file being uploaded from the PEER. The second client acquires the file fragment of the file being uploaded from the PEER, that is, point-to-point data transmission is performed between the PEER and the second client based on a PPP protocol.

Block 210: When the second client receives file upload information, which is sent by the fifth server, for uploading the file, the second client uploads, according to the file upload information, a locally saved file fragment of the file being uploaded to the second server. The file upload information includes an identifier of at least one file fragment that is in multiple file fragments of the file and needs to be uploaded by the second client. The at least one file fragment that needs to be uploaded by the second client may be a file fragment that is not saved in the third server, that is, a file fragment that has not been uploaded by the first client to the second server.

In this block, the file fragment, which is locally saved by the second client, of the file being uploaded includes the file fragment, acquired from the PEER, of the file being uploaded, and a file fragment, which has been downloaded by the second client from the multi-source index server and the multi-source index database, of the file being uploaded. Further, when the second client queries for the PEER, or the second client and the fifth server report by means of heartbeat, the file identifier of a shareable file that is same as that of the file being uploaded, the fifth server sends, to the second client, the file upload information for uploading the file, and sends the address of the second server. By sending, to the second client, the file upload information for uploading the file, the fifth server schedules the second client to transmit a file fragment that is different from the file fragment transmitted by the first client.

When the second client receives the file upload information for uploading the file and the address of the second server that are sent by the fifth server, the second client uploads the locally saved file fragment of the file to the second server according to the file identifier of the to-be-uploaded file. After the second client uploads the file fragment of the to-be-uploaded file to the second server, the second server checks the file fragment. When the check is successful, the second server writes the file fragment into the third server. The second server sends, to the first client and the second client, a message indicating that the file fragment has been uploaded. The second server writes a file identifier of the file, a size of the file, and a name of the file into the fourth server. When the check is unsuccessful, the fifth server sends, to the first client or the second client, file upload information that carries the identifier of the unsuccessfully checked file fragment.

In various embodiments, the first server through the sixth server may be located in the same server or may be located in different servers, which is not limited in the present disclosure. When the first server through the sixth server are located in different servers, the first server may be an upload logic server, the second server may be a storage interface server, the third server may be a cloud storage server, the fourth server may be a storage index server, the fifth server may be an index access server, and the sixth server may be a tracker application (TrackerApp) server. The first server through the sixth server may also be other servers, which is not limited in the present disclosure.

Figure 2B:
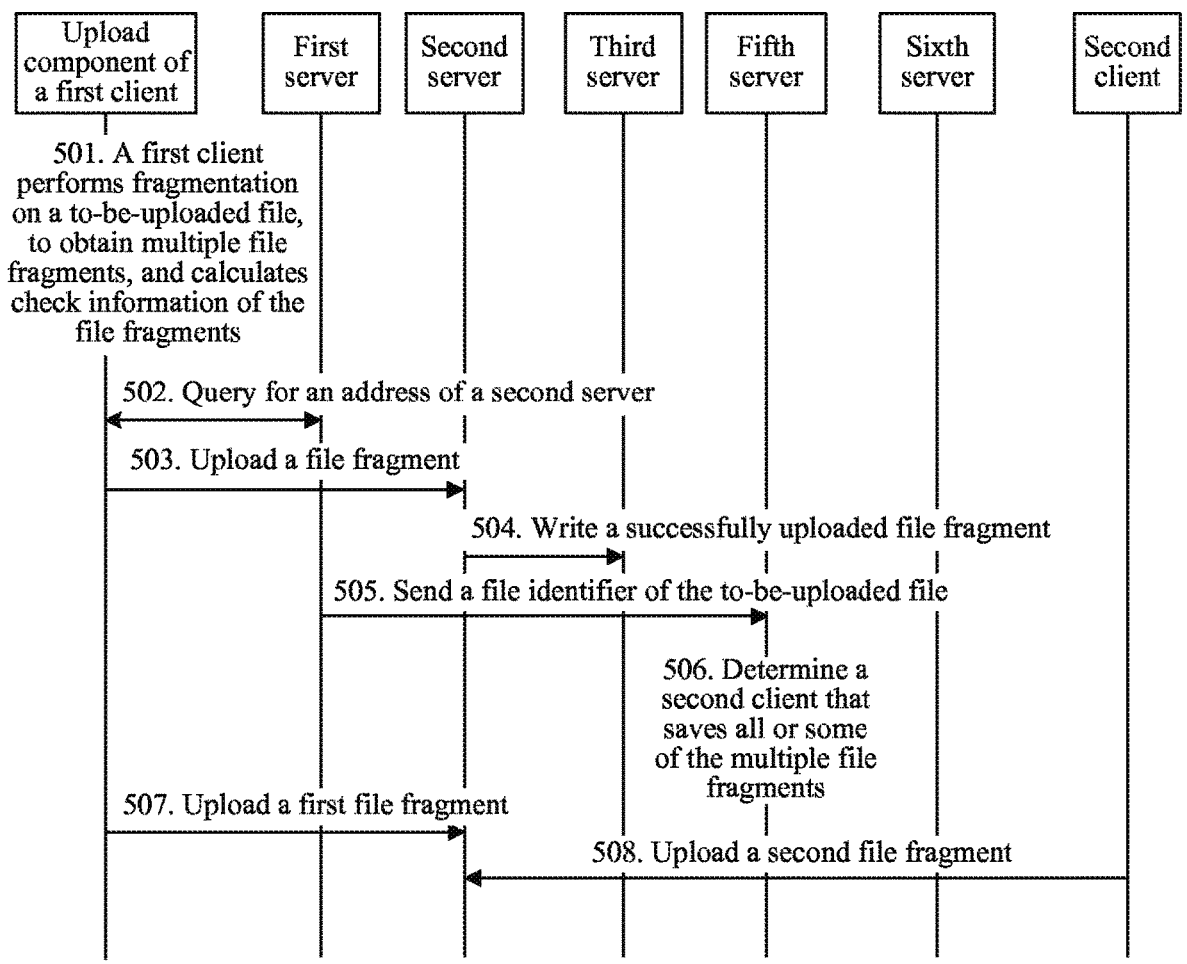
FIG. 2B is a flowchart of a file upload method according to various embodiments.

Various embodiments provide another file upload method. As shown in FIG. 2B, the method includes:

Block 501: A first client performs fragmentation on a to-be-uploaded file to obtain multiple file fragments and calculates check information of the file fragments. A file fragment method and a check information calculation method are the same as that in block 301, and details are not described herein again.

Block 502: The first client queries for an address of a second server from a first server. A specific process of querying, by an upload component of the first client, for the address of the second server from the first server by using a fourth server is the same as block 301 to block 305, and details are not described herein again.

Block 503: An upload component of the first client uploads a file fragment to the second server according to the address of the second server found from the first server.

Block 504: The second server receives the file fragment uploaded by the first client, and writes a successfully uploaded file fragment into a third server. Block 504 is the same as block 204, and details are not described herein again.

Block 505: The first server sends a file identifier of the to-be-uploaded file to a fifth server when the first client uploads the file fragment. Block 505 is the same as block 205, and details are not described herein again.

Block 506: The fifth server determines, according to the file identifier of the file, a second client that saves all or some of the multiple file fragments. Specifically, the fifth server receives a file identifier, which is reported by means of heartbeat, of a shareable file. If the file identifier of the shareable file is the same as an uploading file identifier, the fifth server determines that a client that reports the file identifier of the shareable file is the second client. The fifth server may further determine that a client that searches for a node (PEER) that has downloaded or is downloading the file is the second client.

Before block 506, the second client may acquire all or some of the multiple file fragments of the file in the following two manners:

Manner 1: The second client downloads all or some of the multiple file fragments of the file by using a node (PEER). The second client sends query information to the fifth server. The fifth server forwards the query information to a sixth server, where the query information includes the file identifier. The sixth server is further configured to receive node information for registration sent by the fifth server, and a node information list that can maintain a file online. The sixth server queries, according to the query information, for a node that has downloaded or is downloading the file. If the node is found, the sixth server sends node information of the node to the second client by using the fifth server. The second client downloads the file from the node. The second client acquires the file fragment of the to-be-uploaded file from the node, that is, point-to-point data transmission is performed between the node and the second client based on a PPP protocol.

Manner 2: The second client downloads the file by using a multi-source index server. The second client may query, from a multi-source index server, for a resource and file check information that are intended to be downloaded, that is, the second client queries for a multi-source URL set, and then downloads a file fragment from the found URL set. It should be noted that the file fragment herein is a file fragment of a file intended to be downloaded by a user of the second client. The file fragment may also be a file fragment of a file to be uploaded by the upload component of the first client. After receiving download query information sent by the second client, the multi-source index server queries, from a multi-source index database, whether a resource intended to be downloaded by the second client exists.

The multi-source index server is configured to receive a URL or a HASH value of a URL that is sent by the second client, and use the URL or the HASH value as an index entrance to query for the HASH value of the file fragment or a unique identifier of a file set in which the file is located, receive a URL or a HASH value of a URL that is sent by the second client, and use the URL or the HASH value as an index entrance to query for a downloaded multi-URL resource set, and is further configured to provide check information of a file fragment or centralized file check information of a file set for the second client to check validity of downloaded data. The multi-source index database saves the check information of the file fragment and may provide a multi-resource query service for the multi-source index server. The multi-source index database is further used to save, to the URL set, a HASH 1 and a HASH 2 that correspond to the URL, that is, the URL is a character string. The URL may be used as an input to calculate a HASH 1, that is, a corresponding HASH 1 is obtained by using a URL, the latter HASH 2 is a HASH 2 of file content, and the HASH 1 and the HASH 2 may be in a one-to-one correspondence. Conversely, a HASH 2 of a piece of file content may have different link URLs, which is a one-to-many correspondence, and therefore, is referred to as a set from the HASH 2 to the URL.

Block 507: The first client uploads, when receiving first file upload information sent by the fifth server, a first file fragment to the second server according to an identifier, which is carried in the first file upload information, of the first file fragment that is in the multiple file fragments and needs to be uploaded by the first client.

Block 508: The second client uploads, when receiving second file upload information sent by the fifth server, a second file fragment to the second server according to an identifier, which is carried in the second file upload information, of the second file fragment that is in the multiple file fragments and needs to be uploaded by the second client. The second file upload information may further include the address of the second server. By sending the first file upload information and the second file upload information to the first client and the second client, respectively, the third server schedules the first client and the second client to separately send different file fragments. In this way, two clients transmitting the same file fragment may be avoided, thereby improving the transmission efficiency.

Block 509: The second server checks the first file fragment or the second file fragment when the first file fragment or the second file fragment has been uploaded. When the check is successful, the second sever writes the first file fragment or the second file fragment into the third server. The second server sends, to the first client and the second client, a message indicating that the first file fragment or the second file fragment has been uploaded. The second server writes a file identifier of the file, a size of the file, and a name of the file into the fourth server. When the check is unsuccessful, the fifth server sends, to the first client, the first file upload information that carries the identifier of the unsuccessfully checked first file fragment or the identifier of the unsuccessfully checked second file fragment; or the fifth server sends, to the second client, the second file upload information that carries the identifier of the unsuccessfully checked first file fragment or the identifier of the unsuccessfully checked second file fragment.

In various embodiments, the first server through the sixth server may be located in the same server, or may be located in different servers, which is not limited in the present disclosure. When the first server through the sixth server are located in different servers, the first server may be an upload logic server, the second server may be a storage interface server, the third server may be a cloud storage server, the fourth server may be a storage index server, the fifth server may be an index access server, and the sixth server may be a tracker application (TrackerApp) server. The first server through the sixth server may also be other servers, which is not limited in the present disclosure.

Various embodiments provide a file upload method in which, when an upload component of a client uploads a file, other P2P nodes that are downloading or have downloaded the file can assist the upload component of the client in uploading corresponding file fragments, and when a second client performs file fragment exchange, the locally stored file fragment is uploaded to a corresponding server under unified scheduling of a server, so as to comprehensively break through the limitation of a local upload physical bandwidth, thereby reducing occupation of network resources, implementing data sharing, and increasing a speed of uploading a file during file upload.

Figure 4A:
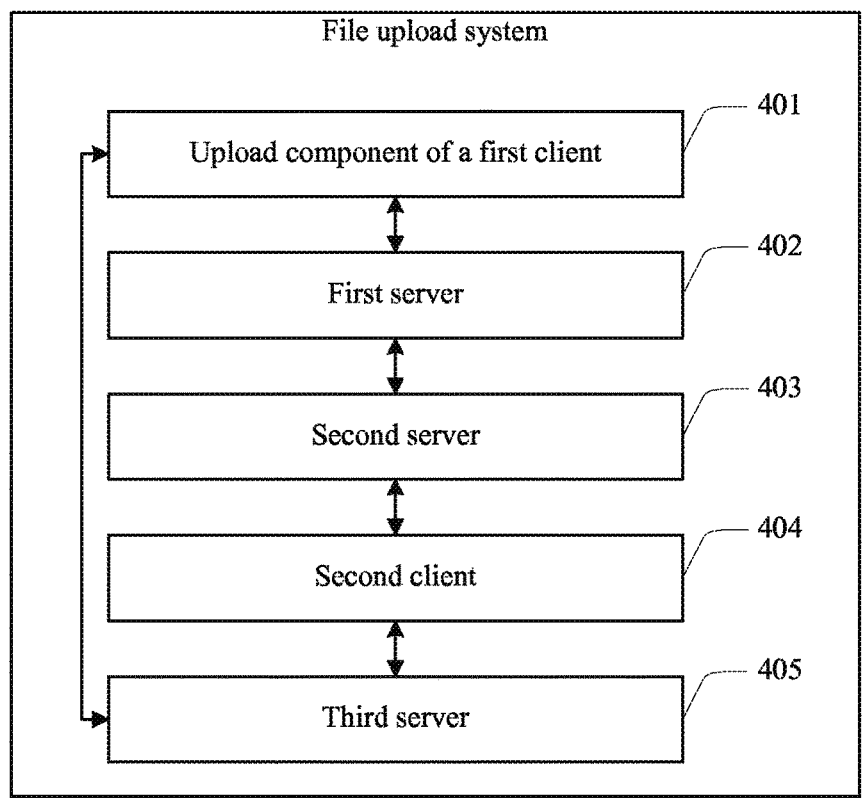
FIG. 4A is a diagram of a file upload system according to various embodiments of the present invention.

Various embodiments provide a file upload system. As shown in FIG. 4A, the system includes an upload component 401 of a first client, a first server 402, a second server 403, a second client 404, and a third server 405. The upload component 401 of the first client is configured to perform fragmentation on a to-be-uploaded file to obtain at least one file fragment and calculate check information of the at least one file fragment and upload a file fragment to the third server 405 according to an address of the third server 405 found from the first server 402. The first server 402 is configured to send a file identifier of the to-be-uploaded file to the second server 403 when the upload component 401 of the first client uploads the file fragment, where the file identifier of the to-be-uploaded file is formed according to check information of the at least one file fragment. The second server 403 is configured to receive the file identifier of the to-be-uploaded file sent by the first server 402 and send, to the second client 404 when the second client 404 queries for a node (PEER), or the second client 404 and the second server 403 report, by means of heartbeat, a file identifier of a shareable file that is same as that of the to-be-uploaded file, file upload information for uploading the file. The second client 404 is configured to upload, to the third server, a locally saved file fragment of the to-be-uploaded file according to the file identifier of the to-be-uploaded file when the second client receives the file upload information sent by the second server 403. The third server 405 is configured to receive the file fragment, which is sent by the upload component 401 of the first client and/or the file fragment sent by the second client 404, of the to-be-uploaded file.

The file upload information includes an identifier of at least one file fragment that is in multiple file fragments of the file and needs to be uploaded by the second client. The at least one file fragment that needs to be uploaded by the second client may be a file fragment that is not saved in the third server, that is, a file fragment that has not been uploaded by the first client to the second server.

It should be noted that generally, due to a limited bandwidth of an upload channel, there is more than one piece of software that is on a machine and needs to be accessed over a network connection. If a piece of software occupies excessive bandwidths of the upload channel, upload of other software may be affected. By pursuing the present disclosure, some work of uploading a file may be completed with the assistance of other second clients, which is equivalent to reducing occupation of network resources by an upload component of a client.

Figure 5A:
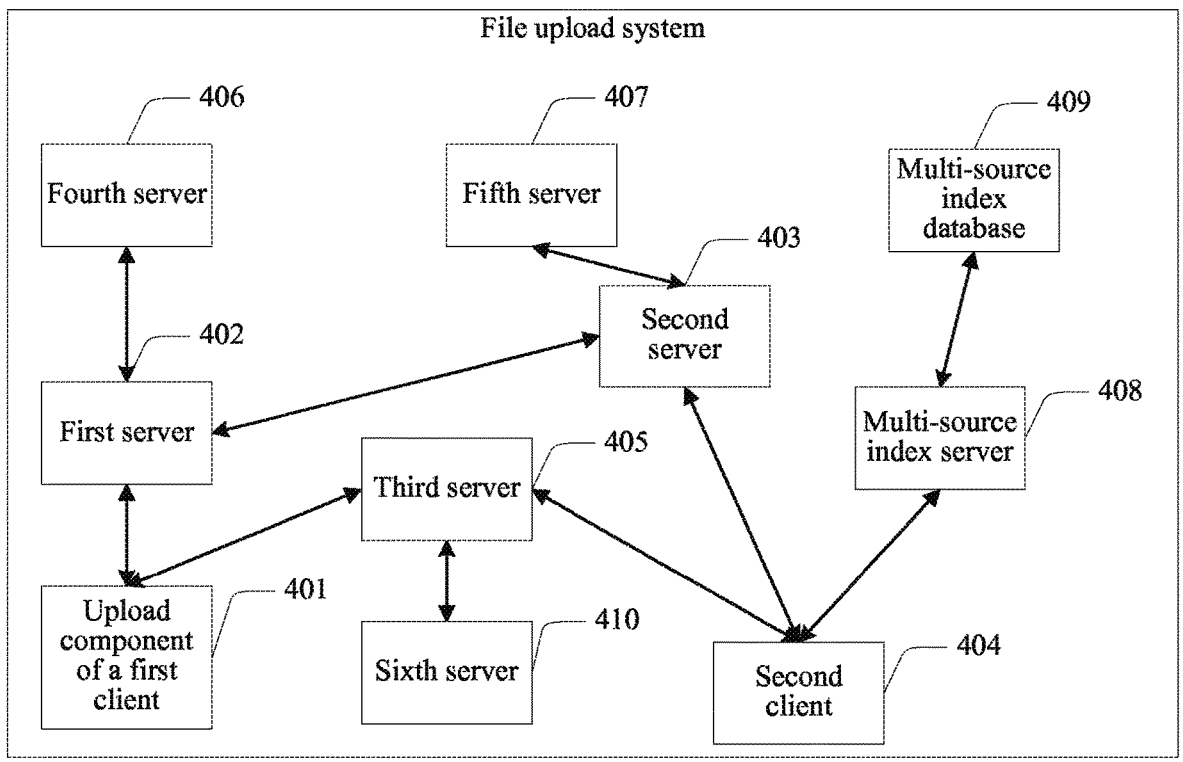
FIG. 5A is a diagram of another file upload system according to various embodiments.

As shown in FIG. 5A, the system further includes a storage index server 406. Before uploading, by the upload component 401 of the first client, the file fragment to the third server 405 according to an address of the third server 405 found from the first server 402, the upload component 401 of the first client is further configured to query, from the first server 402, whether the to-be-uploaded file has been uploaded. The first server 402 is configured to query, by using the fourth server 406, whether the to-be-uploaded file has been uploaded. The fourth server 406 is configured to query whether the to-be-uploaded file has been uploaded, send, to the first server 402 when the to-be-uploaded file is uploaded, a message indicating that the to-be-uploaded file is uploaded, and send, to the first server 402 when the to-be-uploaded file has not been uploaded, a message indicating that the to-be-uploaded file has not been uploaded. When the to-be-uploaded file has been uploaded, the first server 402 is configured to send, to the upload component 401 of the first client, a message indicating that the to-be-uploaded file has been uploaded. The first server is configured to send the address of the third server 405 to the upload component 401 of the first client when the to-be-uploaded file has not been uploaded, and upload, in a resumption manner when a part of the to-be-uploaded file has been uploaded, the file fragment of the to-be-uploaded file according to recorded information about resumed transmission of the to-be-uploaded file that has not been uploaded.

Further, as shown in FIG. 5A, the system further includes a fifth server 407, a multi-source index server 408, and a multi-source index database 409. Before uploading, by the second client 404 according to the file identifier of the to-be-uploaded file, the locally saved file fragment of the to-be-uploaded file to the storage interface server when the second client 404 receives the file upload information, which is sent by the second server 403 for uploading the to-be-uploaded file. The second client 404 sends query information to the second server 403, where the query information is to query for any node (PEER) that has downloaded or is downloading the file fragment of the to-be-uploaded file, and the query information includes the file identifier of the file. The second server 403 sends the query information to the fifth server 407. The fifth server 407 finds the node according to the query information, and sends information of the node to the second client 404 by using the second server 403. The second client 404 acquires the file fragment of the to-be-uploaded file from the node.

The file fragment, which is locally saved by the second client 404, of the to-be-uploaded file includes the file fragment, acquired from the node, of the to-be-uploaded file, and a file fragment, which has been downloaded by the second client 404, of the to-be-uploaded file. The file fragment of the to-be-uploaded file that has been downloaded by the second client 404 is described as follows. The second client may query, from the multi-source index server 408, for a resource and file check information that are intended to be downloaded, that is, the second client queries for a multi-resource URL set, and then download a file fragment from the found URL set. It should be noted that the file fragment herein is a file fragment of a file intended to be downloaded by a user of the second client. Certainly, the file fragment may also be a file fragment of a file to be uploaded by the upload component 401 of the first client.

After receiving the query information about download sent by the second client, the multi-source index server 408 queries, from a multi-source index database 409, whether a resource intended to be downloaded by the second client exists.

The multi-source index server 408 is configured to receive a URL or a HASH value of a URL that is sent by the second client and use the URL or the HASH value as an index entrance to query for the HASH value of the file fragment or a unique identifier of a file set in which the file is located and receive a URL or a HASH value of a URL that is sent by the client, and use the URL or the HASH value as an index entrance to query for a downloaded multi-URL resource set, and is further configured to provide check information of a file fragment or centralized file check information of a file set for the second client to check validity of downloaded data. The multi-source index database 409 saves the check information of the file fragment and may provide a multi-resource query service for the multi-source index server 408. The multi-source index database 409 is further used to save, to the URL set, a HASH 1 and a HASH 2 that correspond to the URL, that is, the URL is a character string. The URL may be used as an input to calculate a HASH 1, that is, a corresponding HASH 1 is obtained by using a URL, the latter HASH 2 is a HASH 2 of file content, and the HASH 1 and the HASH 2 may be in a one-to-one correspondence. Conversely, a HASH 2 of a piece of file content may have different link URLs, which is a one-to-many correspondence, and therefore, is referred to as a set from the HASH 2 to the URL.

Further, the second client 404 is configured to upload, according to the file identifier of the to-be-uploaded file, a locally saved file fragment of the to-be-uploaded file to the third server when the second client 404 receives the file upload information, which is sent by the second server 403, for uploading the to-be-uploaded file. When the second client 404 queries for the node or when the second client 404 and the second server 403 report a file identifier of a shareable file that is same as that of the to-be-uploaded file by means of heartbeat, and when the second server 403 sends the file upload information to the second client 404 and sends the address of the third server 405. When the second client 404 receives the file upload information for uploading the file and the address of the third server 405 that are sent by the second server 403, the second client 404 uploads the locally saved file fragment of the to-be-uploaded file to the third server 405 according to the file identifier of the to-be-uploaded file.

Further, the system further includes a sixth server 410. After the second client 404 uploads the locally saved file fragment of the to-be-uploaded file to the storage interface server according to the file identifier of the to-be-uploaded file when receiving the file upload information sent by the second server 403, when the file fragment of the to-be-uploaded file has been uploaded, the third server 405 checks the uploaded file fragment of the to-be-uploaded file. When the check is successful, the third server 405 writes the file fragment of the to-be-uploaded file into the sixth server 410. The third server 405 sends, to the upload component 401 of the first client and the second client 404, the message indicating that the to-be-uploaded file has been uploaded. The third server 405 writes the file identifier of the to-be-uploaded file, a size of the to-be-uploaded file, and a name of the to-be-uploaded file into the fourth server 406, for query by the upload logic server.

When the check is unsuccessful, the upload component 401 of the first client or the second client 404 re-uploads, according to the file identifier of the to-be-uploaded file, an incorrectly uploaded file fragment in the to-be-uploaded file.

In various embodiments, the first server through the sixth server may be located in the same server, or may be located in different servers, which is not limited in the present disclosure.

When the first server through the sixth server are located in different servers, the first server 402 may be an upload logic server, the second server 403 may be an index access server, the third server 405 may be a storage interface server, the fourth server 406 may be a storage index server, the fifth server 407 may be a tracker application (TrackerApp) server, and the sixth server may be a cloud storage server. The first server through the sixth server may also be other servers, which is not limited in the present disclosure.

Figure 4B:
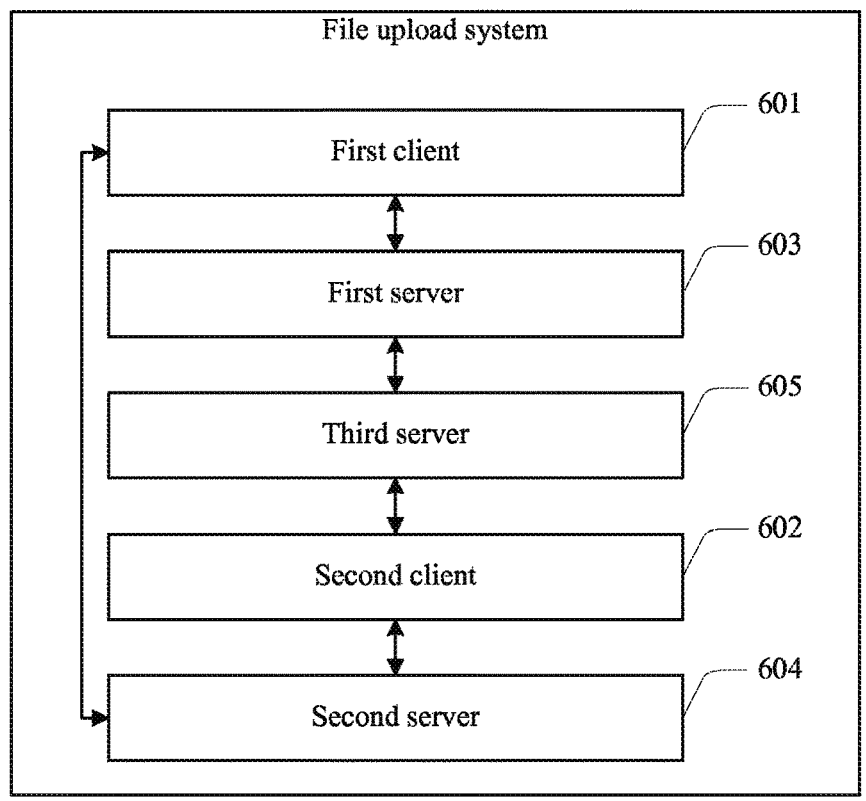
FIG. 4B is a diagram of a file upload system according to various embodiments.

Various embodiments provide another file upload system. As shown in FIG. 4B, the system includes an upload component 601 of a first client, a second client 602, a first server 603, a second server 604, and a third server 605. The first client 601 is configured to perform fragmentation on a to-be-uploaded file to obtain multiple file fragments and calculate check information of the file fragments. The first client 601 uploads a file fragment to the second server 604 according to an address of the second server 604 found from the first server 603, and uploads, when receiving first file upload information sent by the third server 605, a first file fragment to the second server 604 according to an identifier, which is carried in the first file upload information, of the first file fragment that is in the multiple file fragments and needs to be uploaded by the first client 601. The second client 602 is configured to upload, when receiving second file upload information sent by the third server 605, a second file fragment to the second server 604 according to an identifier, which is carried in the second file upload information, of the second file fragment that is in the multiple file fragments and needs to be uploaded by the second client 602. The first server 603 is configured to send a file identifier of the file to the third server 605 when the first client 601 uploads the file fragment. The second server 604 is configured to receive the first file fragment sent by the first client 601, and receive the second file fragment sent by the second client 602. The third server 605 is configured to receive the file identifier of the file sent by the first server 603, determine, according to the file identifier of the file, a second client 602 that saves all or some of the multiple file fragments, send the first file upload information to the first client 601, and send the second file upload information to the second client 602.

The second client 602 is further configured to send query information to the third server 605, where the query information includes the file identifier. The third server 605 is configured to send the query information to a fourth server 606.

Figure 5B:
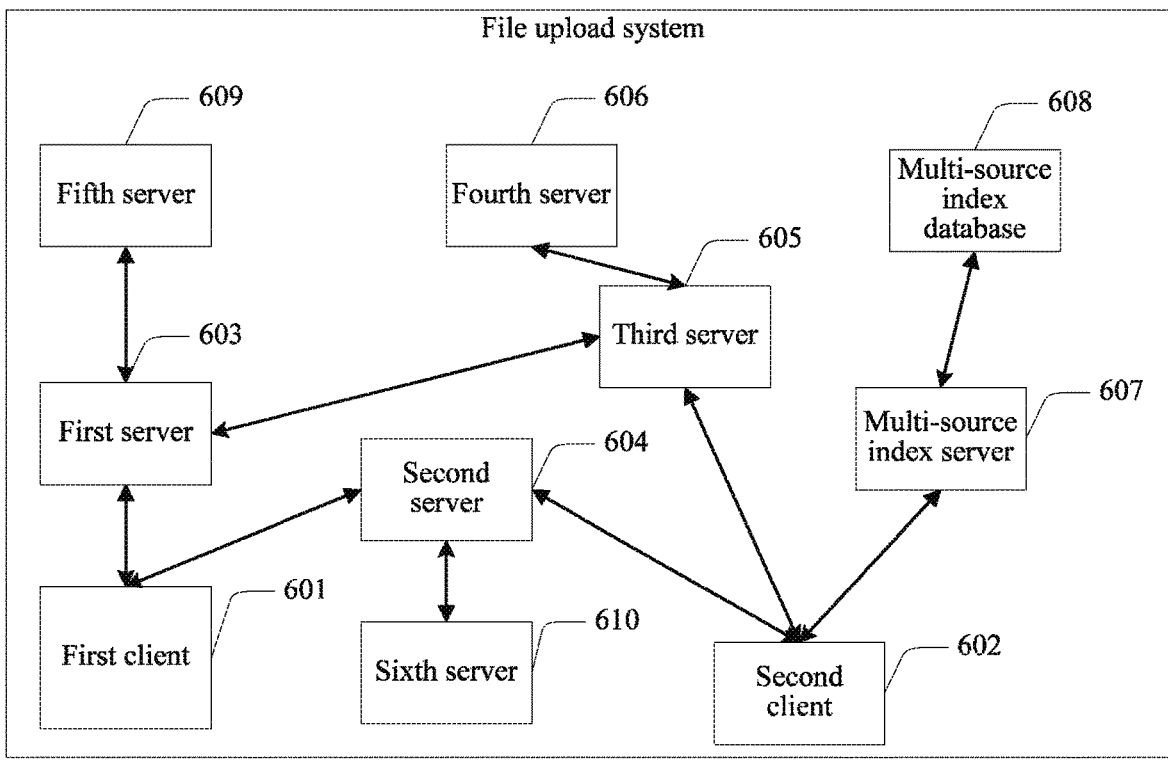
FIG. 5B is a diagram of another file upload system according to various embodiments.

Further, as shown in FIG. 5B, the fourth server 606 is configured to query, according to the query information, for a node that has downloaded or is downloading the file, and send, when the node is found, information of the node to the second client 602 by using the third server 605. The second client 602 is further configured to download the file from the node. The second client 602 is further configured to download the file by using a multi-source index server 607. The second client 602 may query, from the multi-source index server 607, for a resource and file check information that are intended to be downloaded, that is, the second client queries for a multi-source URL set, and then download a file fragment from the found URL set. It should be noted that the file fragment herein is a file fragment of a file intended to be downloaded by a user of the second client 602. The file fragment may also be a file fragment of a file to be uploaded by the first client 601.

After receiving download query information sent by the second client 602, the multi-source index server 607 queries, from a multi-source index database 608, whether a resource intended to be downloaded by the second client 602 exists.

The multi-source index server 607 is configured to receive a URL or a HASH value of a URL that is sent by the second client and use the URL or the HASH value as an index entrance to query for the HASH value of the file fragment or a unique identifier of a file set in which the file is located and receive a URL or a HASH value of a URL that is sent by the client and use the URL or the HASH value as an index entrance to query for a downloaded multi-URL resource set, and is further configured to provide check information of a file fragment or centralized file check information of a file set, for the second client to check validity of downloaded data. The multi-source index database 608 saves the check information of the file fragment and may provide a multi-resource query service for the multi-source index server 607. The multi-source index database 608 is further used to save, to the URL set, a HASH 1 and a HASH 2 that correspond to the URL, that is, the URL is a character string. The URL may be used as an input, to calculate a HASH 1, that is, a corresponding HASH 1 is obtained by using a URL, the latter HASH 2 is a HASH 2 of file content, and the HASH 1 and the HASH 2 may be in a one-to-one correspondence. Conversely, a HASH 2 of a piece of file content may have different link URLs, which is a one-to-many correspondence, and therefore, is referred to as a set from the HASH 2 to the URL.

The third server 605 is configured to receive a file identifier, which is reported by means of heartbeat, of a shareable file, and determine, when the file identifier of the shareable file is the same as an uploading file identifier, that a client that reports the file identifier of the shareable file is the second client 602.

The first client 601 is configured to query, from the first server 603, whether the to-be-uploaded file has been uploaded. The first server 603 is configured to query, by using a fifth server 609, whether the to-be-uploaded file has been uploaded, and send, to the first client 601, an address of the second server 604 when receiving a message, sent by the fifth server 609, indicating that the to-be-uploaded file has not been uploaded. The fifth server 609 is configured to query whether the to-be-uploaded file has been uploaded, and send, to the first server 603 when the to-be-uploaded file has not been uploaded, the message indicating that the to-be-uploaded file has not been uploaded.

The second server 604 is further configured to check the first file fragment or the second file fragment when the first file fragment or the second file fragment has been uploaded. The second server writes the first file fragment or the second file fragment into a sixth server 610 when the check is successful. The second server sends, to the first client 601 and the second client 602, a message indicating that the first file fragment or the second file fragment has been uploaded. The second server writes the file identifier of the file, a size of the file, and a name of the file into the fifth server 609.

The third server 605 is further configured to send, to the first client, the first file upload information that carries the file fragment identifier of the unsuccessfully checked first file fragment or the file fragment identifier of the unsuccessfully checked second file fragment or send, to the second client, the second file upload information that carries the file fragment identifier of the unsuccessfully checked first file fragment or the file fragment identifier of the unsuccessfully checked second file fragment.

The second file upload information may further include the address of the second server.

In various embodiments, the first server through the sixth server may be located in the same server, or may be located in different servers, which is not limited in the present disclosure.

When the first server through the sixth server are located in different servers, the first server 603 may be an upload logic server. The second server 604 may be a storage interface server. The third server 605 may be an index access server. The fourth server 606 may be an index application server. The fifth server 609 may be a storage index server. The sixth server 610 may be a cloud storage server. The first server through the sixth server may also be other servers, which is not limited in the present disclosure.

Various embodiments provide a file upload system, in which an upload component of a first client uploads a file fragment of a to-be-uploaded file to a server, and a second client uploads a locally saved file fragment of the to-be-uploaded file to the server, thereby reducing occupation of network resources, implementing data sharing, and increasing a speed of uploading a file during file upload.

The foregoing descriptions are merely specific implementation manners of the present disclosure, but are not intended to limit the protection scope of the present disclosure. Any variation or replacement known by a person with ordinary skill in the art within the technical scope disclosed in the present disclosure shall fall within the protection scope of the present disclosure. Therefore, the protection scope of the present disclosure shall be subject to the protection scope of the claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

The invention claimed is:

1. A file upload method, comprising:
performing, by a first client, fragmentation on a to-be-uploaded file, to obtain a fixed number of file fragments, each file fragment having a unique identifier and a fragment size dependent on a total size of the to-be-uploaded file;

sending, by the first client, a query to a storage interface server for an address of an upload logic server, wherein the storage interface server is the communicatively coupled to the upload logic server for accessing the address of the upload logic server;

uploading, by the first client at a first time, at least one of the file fragments to the upload logic server according to the address of the upload logic server obtained from the storage interface server;

sending, by the storage interface server, a file identifier of the file to a storage index server when the first client uploads the at least one of the file fragments to the upload logic server, wherein the file identifier of the file is calculated from the unique identifiers of the file fragments of the file;

determining, by the storage index server according to the file identifier of the file, file upload information identifying (a) a plurality of file segments associated with the file and (b) a second client that saves at least one of the plurality of file fragments and that has submitted query information that includes the file identifier of the file to the storage index server, wherein:

the file upload information is further divided into (i) first file upload information including a first set of file fragment identifiers corresponding to the file fragments stored at the first client and (ii) second file upload information including a second set of file fragment identifiers corresponding to the file fragments stored at the second client;

the first set of file fragment identifiers does not overlap the second set of file fragment identifiers;

the storage index server is configured to receive heartbeat communication from the second client; and the second client has downloaded, at a prior time, at least the second set of file fragments of the file and received the file identifier of the file from a peer device using a peer-to-peer (P2P) relationship;

in response to a determination that the second client saves at least one of the file fragments and the file upload information:

sending, by the storage index server to the first client, a first request including the first file upload information corresponding to the first set of file fragments stored at the first client;

sending, by the storage index server to the second client, a second request including the second upload file information corresponding to the second set of file fragments stored at the second client;

in response to the first request, resuming uploading, by the first client to the upload logic server at a second time, a first file fragment corresponding to a file fragment identifier within the first set of file fragment identifiers carried in the first file upload information; and in response to the second request, uploading, by the second client to the upload logic server, a second file fragment corresponding to a file fragment identifier within the second set of file fragment identifiers carried in the second file upload information, wherein the second client is configured to report the file fragment identifier to the storage index by heartbeat.

2. The method according to claim 1, wherein the determining a second client that saves the at least one of the file fragments comprises:

receiving, by the storage index server, a file identifier being reported by means of the heartbeat communication and being of a shareable file; and determining, when the file identifier of the shareable file is the same as the file identifier of the file being uploaded, that a client that reports the file identifier of the shareable file is the second client; or determining, by the storage index server, when finding a client that completes download of the file or is downloading the file, that the found client is the second client.

3. The method according to claim 1, further comprising:

writing, by the upload logic server, a first file fragment of the at least one of the file fragments into a fifth server when a check for the uploaded first file fragment is successful;

sending, by the upload logic server to the first client and the second client, a message indicating that the first file fragment is uploaded; and writing the file identifier of the file, a size of the file, and a name of the file into a sixth server;

writing, by the upload logic server, a second file fragment of the at least one of the file fragments into the fifth server when a check for the uploaded second file fragment is successful; and sending, by the upload logic server to the first client and the second client, a message indicating that the second file fragment is uploaded; and writing the file identifier of the file, the size of the file, and the name of the file into the sixth server.

4. The method according to claim 1, further comprising:

sending, by the storage index server to the first client when a check for the uploaded first file fragment or a check for the uploaded second fragment is unsuccessful, the first file upload information that carries the file fragment identifier of a first file fragment of the at least one of the file fragments when the check for the first uploaded file fragment is unsuccessful or carries the file fragment identifier of a second file fragment of the at least one of the file fragments when the check for the uploaded second fragment is unsuccessful; or sending, by the storage index server to the second client when a check for the uploaded first file fragment or a check for the uploaded second fragment is unsuccessful, the second file upload information that carries the file fragment identifier of the first file fragment when the check for the uploaded first file fragment is unsuccessful or carries the file fragment identifier of the second file fragment when the check for the uploaded second fragment is unsuccessful.

5. A file upload system, comprising:

a first client, configured to:

perform fragmentation on a to-be-uploaded file, to obtain a fixed number of file fragments, each file fragment having a unique identifier and a fragment size dependent on a total size of the to-be-uploaded file;

send a query to a storage interface server for an address of an upload logic server, wherein the storage interface server is the communicatively coupled to the upload logic server for accessing the address of the upload logic server;

upload, at a first time, at least one file fragment in the fixed number of file fragments to the upload logic server according to the address of the upload logic server found from the storage interface server;

the first server, configured to:
send a file identifier of the file to a storage index server when the first client uploads the at least one file fragment to the upload logic server, wherein the file identifier of the file is calculated from the unique identifiers of the file fragments of the file;

the third server, configured to:
determine, according to the file identifier of the file, file upload information identifying (a) a plurality of file segments associated with the file and (b) a second client that saves at least one of the plurality of file fragments and that has submitted query information that includes the file identifier of the file to the storage index server, wherein:
the file upload information is further divided into (i) first file upload information including a first set of file fragment identifiers corresponding to the file fragments stored at the first client and (ii) second file upload information including a second set of file fragment identifiers corresponding to the file fragments stored at the second client;
the first set of file fragment identifiers does not overlap the second set of file fragment identifiers;
the storage index server is configured to receive heartbeat communication from the second client; and
the second client has downloaded, at a prior time, at least the second set of file fragments of the file and received the file identifier of the file from a peer device using a peer-to-peer (P2P) relationship;

in response to a determination that the second client saves at least one of the file fragments and the file upload information, the storage index server, configured to:
send to the first client a first request including the first file upload information corresponding to the first set of file fragments stored at the first client; and
send to the second client a second request including the second upload file information corresponding to the second set of file fragments stored at the second client;

in response to the first request, resuming uploading, by the first client to the upload logic server at a second time, a first file fragment corresponding to a file fragment identifier within the first set of file fragment identifiers carried in the first file upload information; and in response to the second request, uploading, by the second client to the upload logic server, a second file fragment corresponding to a file fragment identifier within the second set of file fragment identifiers carried in the second file upload information, wherein the second client is configured to report the file fragment identifier to the storage index by heartbeat.

6. The system according to claim 5, wherein the storage index server is further configured to receive a file identifier of a shareable file, wherein the file identifier is reported by the first client or the second client by means of the heartbeat communication.

7. The system according to claim 5, wherein the upload logic server is further configured to:
write the uploaded first file fragment into a fifth server when a check for the uploaded first file fragment is successful;
send, to the first client and the second client, a message indicating that a first file fragment of the at least one of the file fragments is uploaded;
write the file identifier of the file, a size of the file, and a name of the file into a sixth server;
write the uploaded second file fragment into a fifth server when a check for the uploaded second file fragment is successful;
send, to the first client and the second client, a message indicating that a second file fragment of the at least one of the file fragments is uploaded; and
write the file identifier of the file, a size of the file, and a name of the file into a sixth server.

* * * * *